Sept. 25, 1956  R. H. VON AHRENS  2,764,426
WELDING RING WITH NUBS REMOVABLE BY STRIKING
Filed April 23, 1954

INVENTOR.
Robert H. von Ahrens
BY
Pennie Edmonds Morton, Barrows & Taylor
ATTORNEYS

United States Patent Office 2,764,426
Patented Sept. 25, 1956

2,764,426

WELDING RING WITH NUBS REMOVABLE BY STRIKING

Robert H. von Ahrens, Elizabeth, N. J.; Dagny A. Ahrens, Elizabeth, N. J., executrix of said Robert H. von Ahrens, deceased Application April 23, 1954, Serial No. 425,286

2 Claims. (Cl. 285—22)

This invention relates to welding rings of the type employed in welding together the ends of pipe sections.

In the welding together of pipe ends a backing member, usually in the form of a metal ring, having an outer diameter substantially equal to the inside diameter of the pipe is inserted part way into the end of one pipe and the other pipe end is then slid over the projecting end of the ring. This ring, overlapping the gap between the adjacent pipe ends, functions in the manner of a backing strip designed to prevent the molten weld metal from flowing into the interior of the pipe forming icicles therein which would impede the fluid flow therethrough. The pipe ends are usually spaced a slight distance apart upon the ring so as to provide a gap for facilitating the insertion of a weld rod to the bottom of the groove in order that the entire end surfaces of the pipe ends may be solidly fused together.

It is the practice to provide nubs or protuberances on the outer surface of the ring against which the ends of the pipe sections abut to properly space the ends of the sections and provide the desired space between them. In my prior Patent No. 2,366,579, granted January 2, 1945 (Reissue No. 22,725, granted February 19, 1946) I have disclosed and claimed a welding ring in which these nubs are formed by punching the material of which the ring is formed outwardly from the reverse side of the ring. For many uses such ring has advantages over welding rings in which the nubs are otherwise formed. But in some instances, it is desirable to provide a ring in which the nubs initially serve to space the pipe ends but are then removed so that the weld joint is formed entirely of welding metal.

The present invention is directed to the latter type of welding rings. I employ a series of nubs which are of the proper size to space the pipe ends the desired distance from each other, and which are longer than the nubs or ridges generally employed on welding rings. The nubs of the present invention are generally of a greater length than the thickness of the pipe so that when the ring is arranged in the pipe ends, they project beyond the outer wall of the pipe. They are provided with rounded ends and their inner ends are welded to the outer surface of the ring. The outer face of the ring which engages the inside of the pipe ends is a flat surface. The ring is inserted in the pipe ends in the usual manner and the pipe ends are then tack-welded to the ring at a number of spaced points, preferably adjacent each of the nubs. The nubs are then removed. This can be readily done and the removal of the nubs is facilitated by their rounded ends. The weld is then completed in the usual manner.

One of the advantages of removing the nubs is that the possibility of discontinuities in the weld is greatly reduced. A further advantage is that the weld produced is of uniform composition, which is not the case when nubs of a different composition than the weld metal are melted into and form a part of the weld metal.

In the accompanying drawings I have shown one embodiment of my invention. In this showing:

Figure 1:
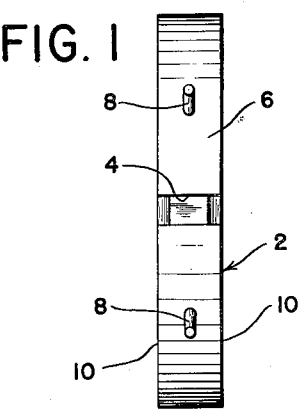
Fig. 1 is a front elevation of the welding ring of the present invention.
Figure 2:
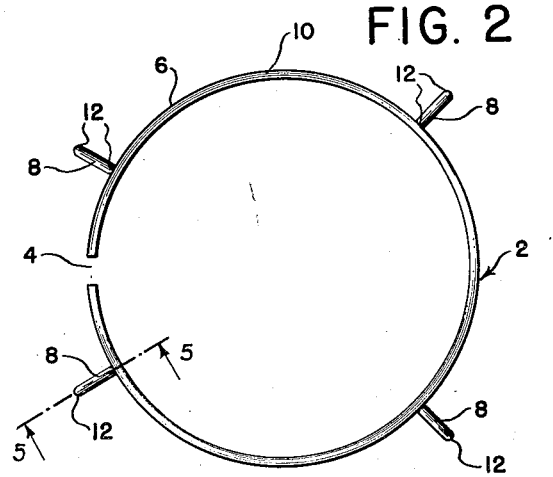
Fig. 2 is a side elevation.
Figure 5:
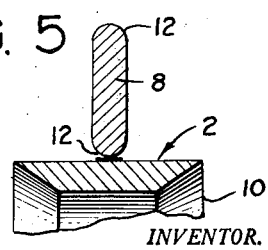
Fig. 5 is a detailed, sectional view on an enlarged scale, on line 5—5 of Fig. 2.

Referring to the drawings, I provide a ring 2 formed of a suitable metal, generally an iron or steel alloy. A gap 4 is provided between the two ends of the ring. The ring, as shown in Figs. 1 and 2, is generally of a slightly greater diameter than the inside diameter of the pipe sections with which it is to be used. When it is placed in the pipe, it is compressed to close the gap, and then expands to snugly engage the inner walls of the pipe sections. To insure close contact between the ring and the pipe wall, the outer surface 6 of the ring is preferably flat. Nubs 8 are arranged at spaced intervals on the outer surface 6 of the ring. The nubs are shown as centrally arranged on the ring. While this is not essential, it is preferable, and it is, of course, necessary that the nubs be equally spaced from the sides 10 of the ring, that is, that they be aligned circumferentially. The nubs are preferably formed of round stock and are also provided with rounded ends 12. They are secured to the surface 6 by welding, with the weld metal confined to a small area of the rounded end, as shown in Fig. 5. The provision of the rounded ends thus facilitates removal of the nubs after the pipe sections are assembled on the ring. The size of the nubs may vary within certain limits. Their diameter determines the spacing of the pipe ends, and should be sufficient to permit the weld rod to get to the bottom of the gap between the pipe ends. This may be from ⅛ inch to ¼ inch. Their length is preferably greater than the thickness of the pipe, and may be as much as 1 inch.

Figure 3:
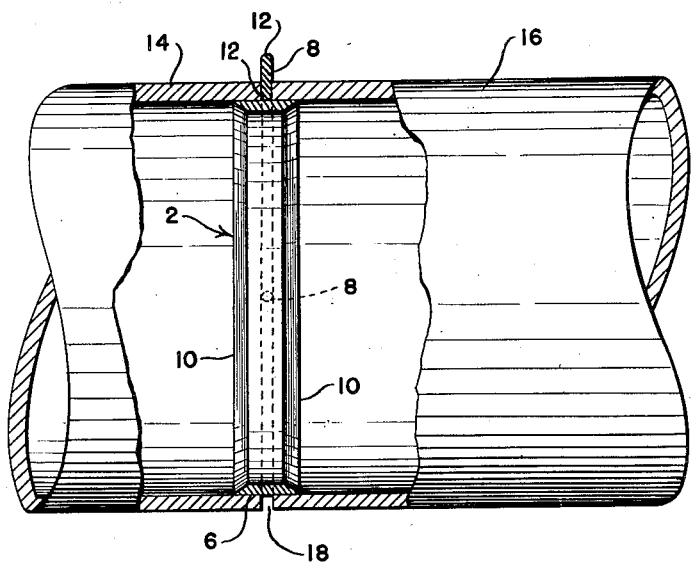
Fig. 3 is a longitudinal, sectional view of a welding ring assembled with two pipe ends, prior to welding.
Figure 4:
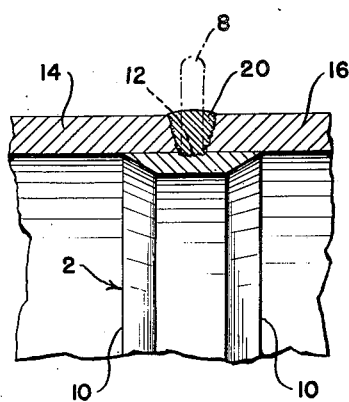
Fig. 4 is a similar view after welding, the nub which has actually been removed being shown in dotted lines.

Referring to Fig. 3, the ring 2 is inserted in the end of pipe section 14 until the pipe end abuts the nubs 8. The end of the other section 16 is then slid over the ring until it also abuts the nubs 8. This forms a gap 18 between the ends of pipe sections 14 and 16, this gap being of a width that will allow a weld rod to be inserted to the bottom of it. The pipe sections are then tack-welded to the ring 2, and the nubs removed by striking them with a hammer or other tool. The weld is then completed as indicated at 20 in Fig. 4 of the drawings. In this figure a nub 8 is shown in dotted lines. This is to indicate that the nubs occupy a part of the gap into which the welding metal is placed from which it is obvious that if the nubs were not removed, they would be melted into the weld. Thus the weld would be of non-uniform composition unless the nubs happen to be of the same composition as the weld metal, which is unlikely.

In welding pipes of heavier wall section, requiring the use of relatively large diameter weld rods, it may be inadvisable to employ nubs of a diameter equal to that of the wider gap which would be necessary. Two rows of nubs spaced from each other may then be used, as disclosed in my prior patent. In such instances, one pipe section abuts the rows of nubs toward one side of the ring, and the other section abuts the other row of nubs. The width of the gap is then the distance between the outsides of the two rows of nubs.

I claim:

1. A welding ring comprising an annular metallic member having a cylindrical outer face, and a plurality of nubs welded to the outer face and extending radially outward therefrom, the nubs being aligned circumferentially to space the ends of two tubular members into which said ring is inserted to provide a gap for the reception of a welding rod when the tubular members are welded to each other, each of the nubs being provided with a rounded, inner end, said rounded inner end being secured to the annular member by being welded thereto so that removal of the nub by a blow after the tubular members are assembled on the annular member is facilitated.

2. A welding ring comprising an annular metallic member having a cylindrical outer face, and a plurality of nubs welded to the outer face and extending radially outward therefrom, the nubs being aligned circumferentially to space the ends of two tubular members into which said ring is inserted to provide a gap for the reception of a welding rod when the tubular members are welded to each other, the nubs being of uniform diameter substantially through their entire length and having an end portion of reduced cross-section, said end portion being welded to the annular metallic member so that removal of the nub by a blow after the tubular members are assembled on the annular member is facilitated.

References Cited in the file of this patent

UNITED STATES PATENTS

| | | |
|---|---|---|
| 1,939,772 | Greene | Dec. 19, 1933 |
| 1,960,105 | Greene | May 22, 1934 |
| 2,537,776 | Markl | Jan. 9, 1951 |